(12) United States Patent
Matousek et al.

(10) Patent No.: US 6,976,914 B2
(45) Date of Patent: Dec. 20, 2005

(54) IMPELLER WITH SWEPT BACK BLADES FOR A TAILINGS CONVEYOR OF AN AGRICULTURAL COMBINE

(75) Inventors: Robert A. Matousek, Milan, IL (US); Jonathon E. Ricketts, Viola, IL (US); James R. Schmidt, Blue Grass, IA (US)

(73) Assignee: CNH America LLC, Racine, WI (US)

( * ) Notice: Subject to any disclaimer, the term of this patent is extended or adjusted under 35 U.S.C. 154(b) by 7 days.

(21) Appl. No.: 10/620,409

(22) Filed: Jul. 15, 2003

(65) Prior Publication Data

US 2005/0020332 A1    Jan. 27, 2005

Related U.S. Application Data

(63) Continuation-in-part of application No. 10/340,263, filed on Jan. 10, 2003.

(51) Int. Cl.[7] ............................................. A01D 17/02
(52) U.S. Cl. ...................................... 460/114; 460/11
(58) Field of Search ............................. 460/11, 12, 13, 460/14, 59, 70, 97, 98, 99, 114, 902, 903

(56) References Cited

U.S. PATENT DOCUMENTS

| 1,019,962 A | | 3/1912 | Hutton | |
| 1,406,394 A | * | 2/1922 | Junkin | 460/63 |
| 1,498,409 A | | 7/1924 | Walsh | |
| 1,502,702 A | | 7/1924 | Wagner | |
| 2,028,344 A | | 1/1936 | Mitchell | |
| 2,292,650 A | | 8/1942 | Oehler et al. | |
| 3,115,142 A | | 12/1963 | Kepkay | |
| 3,976,084 A | * | 8/1976 | Weber | 460/14 |
| 4,062,366 A | * | 12/1977 | De Coene | 460/14 |
| 4,292,981 A | * | 10/1981 | De Busscher et al. | 460/14 |
| 4,307,732 A | * | 12/1981 | De Busscher et al. | 460/99 |
| 4,310,004 A | * | 1/1982 | De Busscher et al. | 460/14 |
| 4,875,891 A | | 10/1989 | Turner et al. | |
| 5,624,315 A | * | 4/1997 | Jonckheere | 460/99 |
| 5,822,967 A | | 10/1998 | Hood et al. | |
| 6,467,237 B2 | | 10/2002 | Viaud | |
| 6,669,558 B1 | * | 12/2003 | Wolters et al. | 460/14 |
| 2004/0137973 A1 | * | 7/2004 | Schmidt | 460/13 |
| 2004/0266503 A1 | | 12/2004 | Schmidt et al. | |
| 2005/0009592 A1 | | 1/2005 | Schmidt | |

* cited by examiner

*Primary Examiner*—Meredith Petravick
(74) *Attorney, Agent, or Firm*—Brant T. Maurer; Rebecca Henkel

(57) ABSTRACT

A rotary impeller for a tailings conveyor of an agricultural combine, for threshing tailings and propelling the tailings through a portion of the conveyor, including a mounting portion mountable to a rotatable member for rotation in a predetermined rotational direction about a rotational axis, a plurality of blades extending generally radially outwardly from the mounting portion, each of the blades including a surface facing in the rotational direction including a radially outermost threshing portion for threshing the tailings and propelling the tailings in the rotational direction through the portion of the conveyor, and a tailings deflecting portion disposed between the threshing portion and the mounting portion, the tailings deflecting portion having a convex shape for deflecting and directing tailings contacted thereby during the rotation in a radially outward direction into a rotational path of the threshing portion so as to be threshed thereby and accelerated through the conveyor.

15 Claims, 7 Drawing Sheets

US 6,976,914 B2

IMPELLER WITH SWEPT BACK BLADES FOR A TAILINGS CONVEYOR OF AN AGRICULTURAL COMBINE

This application is a Continuation-In-Part of U.S. patent application Ser. No. 10/340,263, filed Jan. 10, 2003.

BACKGROUND

This invention relates generally to an agricultural harvesting machine, and more particularly, to a rotary impeller for a tailings conveyor of a harvesting machine having blades configured and shaped for providing desired tailings conveying and threshing functions.

Typically, an agricultural harvesting machine such as a combine gathers crop from a field and transports the crop by means of a feeder house to a threshing and separating device located inside the combine. Generally, threshing refers to removing grain, beans, seeds or kernels, hereinafter referred to as just grain, which are desired to be collected, from husks, cobs, pods, stems, and other portions of the plants being harvested, which are to be discarded. The threshing and separating device delivers the crop to the cleaning system of the combine, which includes a plurality of sieves. An upper sieve allows clean grain and some material other than grain (MOG) to fall through it, and a lower sieve is adjusted so that only clean grain is allowed to pass through it. The material including the clean grain and MOG that falls through the upper sieve, but does not pass through the lower sieve, is called tailings. In many cases it is desired for this material to be threshed and/or cleaned again.

Prior methods accomplish the threshing and/or cleaning of the tailings by conveying them to one side of the combine with an auger. The tailings are then carried by a conveyor, typically a paddle and chain conveyor, back to the combine threshing mechanism. Some combines have used a rethreshing device which is separate from the threshing system which helps save capacity on the threshing system by rethreshing the tailings separately from new crop coming into the combine. The auger feeds material into the rethreshing device and then the material is conveyed back to the cleaning system. Both single impeller/blowers and augers have been used to convey this material back to the cleaning system. These rethreshing devices are usually convertible, enabling the operator to manipulate the machine to be more or less aggressive, depending on the vulnerability of the grain to damage, during processing.

Prior methods for conveying the tailings material are inefficient in terms of throughput capacity and power consumption. Some known embodiments have resulted in large conveying devices that tend to limit access to both the combine and the conveying device for maintenance and conversion.

Therefore, what is needed is a more efficient means for conveying tailings, which overcomes many of the limitations and shortcomings set forth above, and which provides a desired threshing function.

SUMMARY

What is disclosed is a rotary impeller for a tailings conveyor which provides a more efficient means for conveying or propelling tailings through a portion or region of a tailings conveyor, while performing a threshing function.

According to a preferred embodiment of the invention, the impeller includes a mounting portion mountable to a rotatable member of the conveyor for rotation therewith in a predetermined rotational direction about a rotational axis, and a plurality of blades extending generally radially outwardly from the mounting portion, each of the blades including a surface facing in the rotational direction including a radially outermost threshing portion for threshing the tailings while propelling them in the rotational direction through the portion of the conveyor. A tailings deflecting portion is disposed between the threshing portion and the mounting portion, the tailings deflecting portion preferably having a convex shape for deflecting tailings contacted thereby during the rotation in a radially outward direction into a rotational path of the threshing portion for threshing and propelling in the rotational direction thereby, the threshing portion preferably being swept back or more rearward relative to the deflecting portion in the rotational direction, such that the tailings are deflected at least largely forwardly of or in advance of or in the path of the threshing portion for threshing and propelling in the rotational direction thereby through the conveyor.

As a result, efficiency is improved as the tailings are threshed as they are conveyed back to the to the cleaning system or another desired location on the combine.

DETAILED DESCRIPTION OF THE PREFERRED EMBODIMENTS

Figure 1:
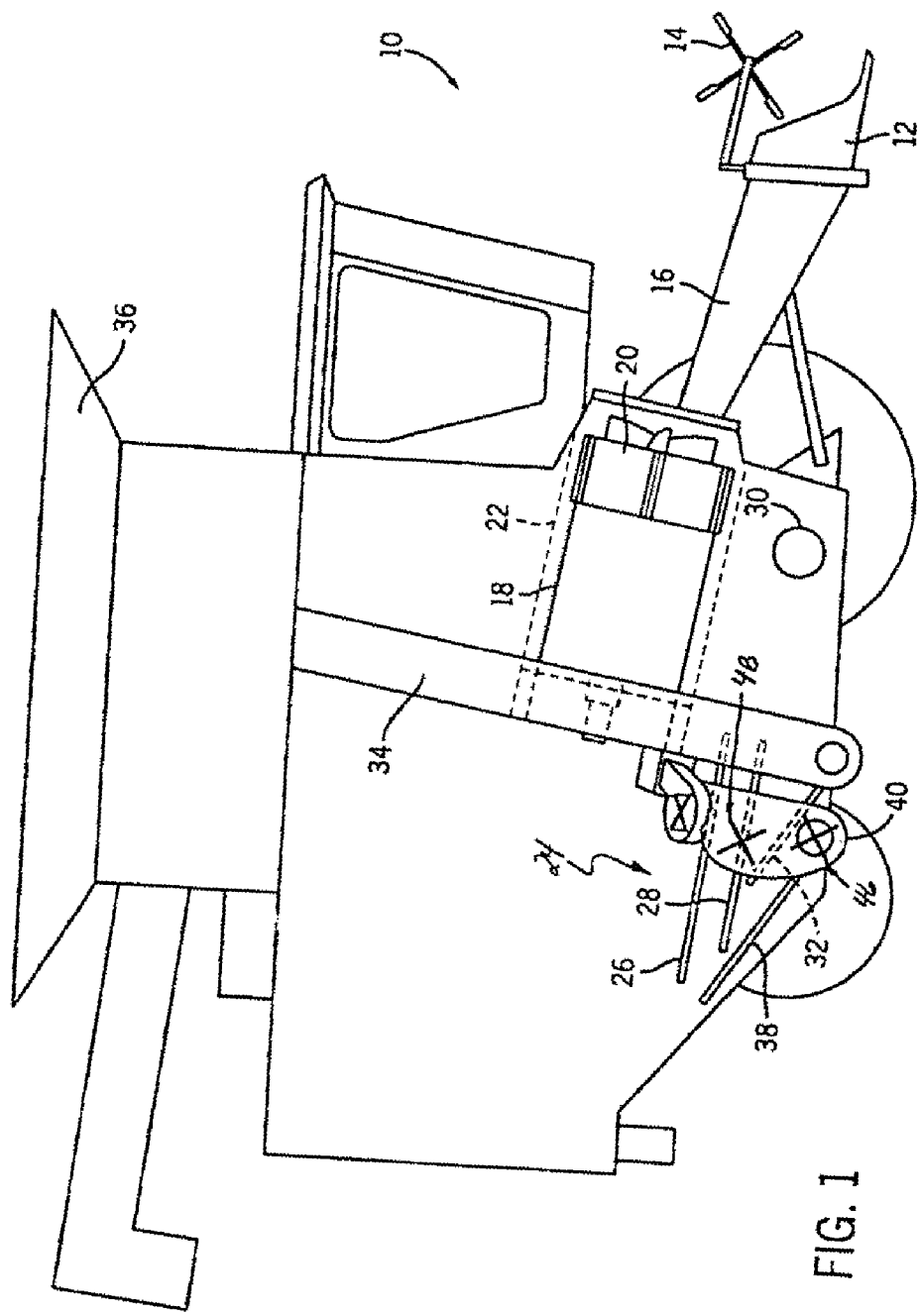
FIG. 1 is a simplified side view illustrating an embodiment of the major components of an agricultural harvesting machine.
Figure 2:
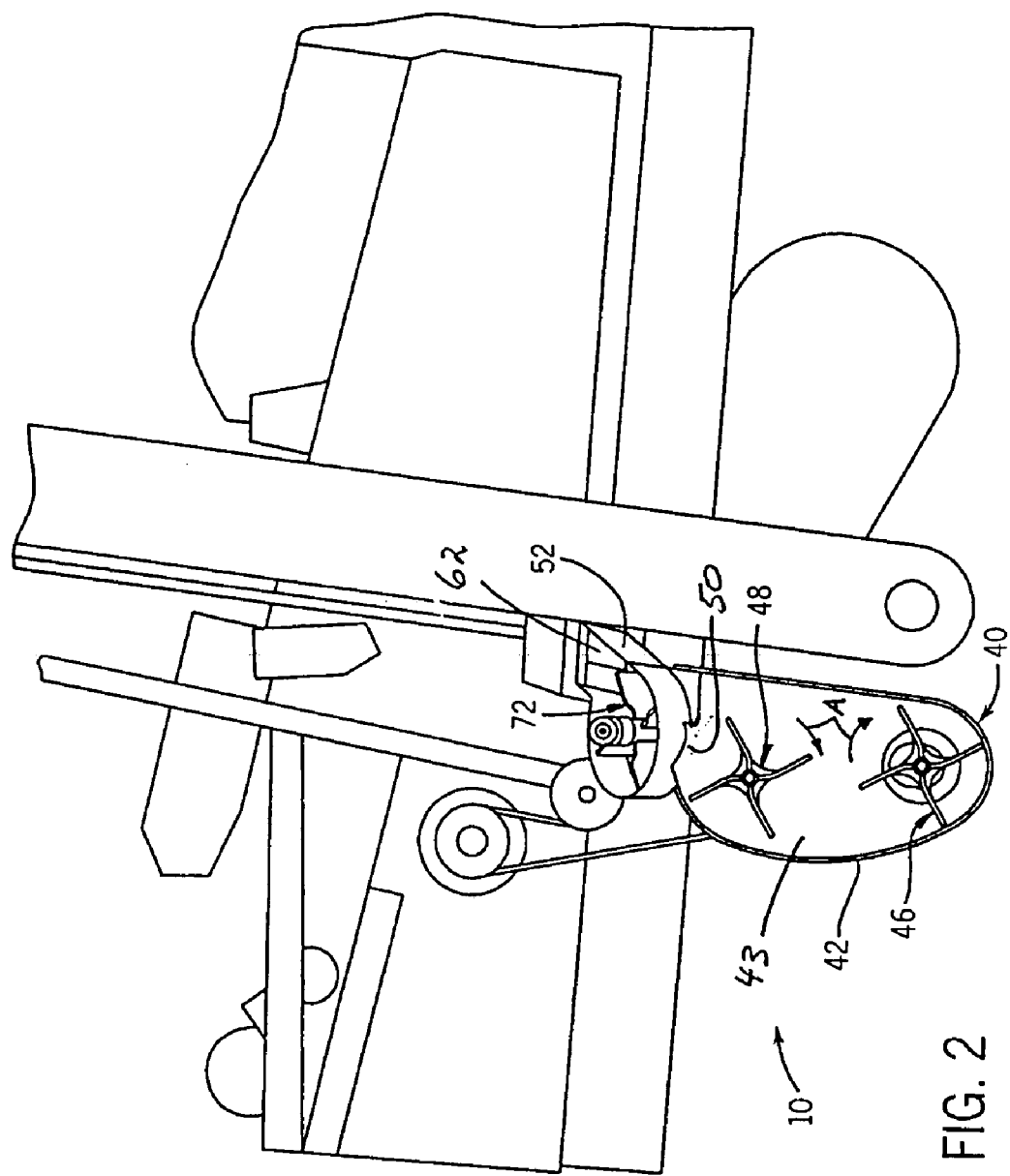
FIG. 2 is a more detailed view of the harvesting machine of FIG. 1 depicting an embodiment of a tailings conveyor within the machine with a front cover of the conveyor removed to show internal aspects thereof including several rotary impellers of the invention.

Referring to FIG. 1, an agricultural harvesting machine 10, incorporating the principles of the instant invention, has a header 12, a reel 14, and a feeder 16. Crop material is collected by header 12 and reel 14 and taken into agricultural harvesting machine 10 through feeder 16 in a conventional manner.

A threshing assembly 18 includes a rotor 20 and a perforated housing 22. Rotor 20 is rotated within perforated housing 22. Crop is received from feeder 16 and is passed through clearances between rotor 20 and perforated housing 22 to thresh grain. Grain which is threshed in the clearances between housing 22 and rotor 20 falls through the perforations in housing 22 and is transported to a cleaning system 24 including a chaffer sieve 26 and a shoe sieve 28. Chaffer sieve 26 and shoe sieve 28 are members that oscillate back and forth. Sieves 26 and 28 have a plurality of apertures for allowing the properly threshed grain to fall through. A blower 30 blows air through sieves 26 and 28 and out the rear of agricultural harvesting machine 10. Chaff will be blown outward along with the air. The clean grain falls through sieves 26 and 28 onto an inclined plane 32. Clean grain travels along plane 32 and then through a grain elevator 34, to a grain storage area 36.

Grain and material other than grain (MOG), which is too heavy to become air borne and falls through chaffer sieve 26 but does not pass through shoe sieve 28 is commonly known as tailings. Tailings end up on a plane 38 and are rethreshed and conveyed in a tailings conveyor 40 and discharged from tailings conveyor 40 onto chaffer sieve 26.

As in best seen in FIG. 2–6, tailings conveyor 40 includes a housing 42 including an interior portion 43; a first opening 44 communicating with interior portion 43; a first rotary impeller 46 and a second rotary impeller 48 located in interior portion 43; and a second opening 50 communicating with interior 43 and a conduit 52. A third impeller 72 is located in conduit 52. The first and second impellers 46 and 48 are each rotated in predetermined rotational directions A on shafts 58 and 51, respectively, about substantially parallel rotational axes C and D extending longitudinally through the centers of shafts 58 and 51, respectively. The third impeller 72 may rotate in the opposite direction or as alternative in the same direction as the bottom two impellers 46 and 48.

Figure 3:
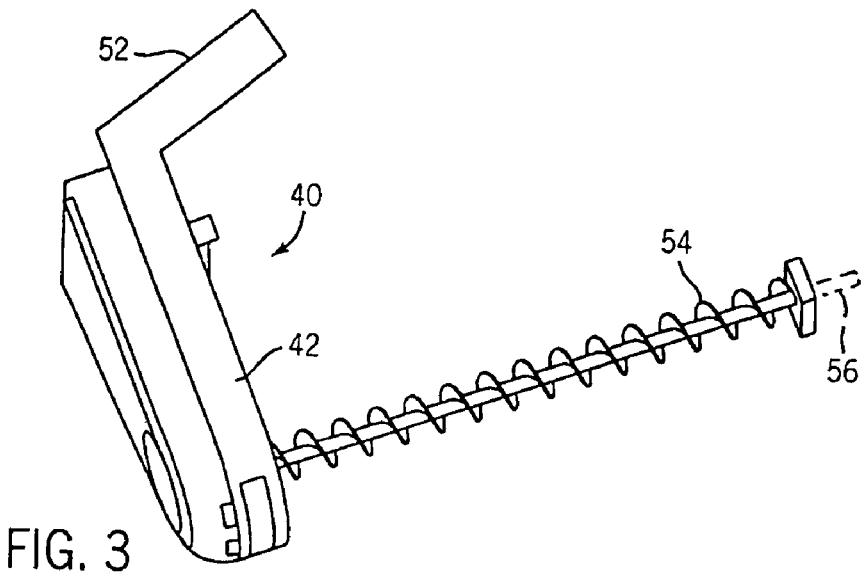
FIG. 3 is a perspective view of an embodiment of the conveyor of FIG. 2 in association with a feed auger of the machine for feeding tailings to the conveyor.
Figure 4:
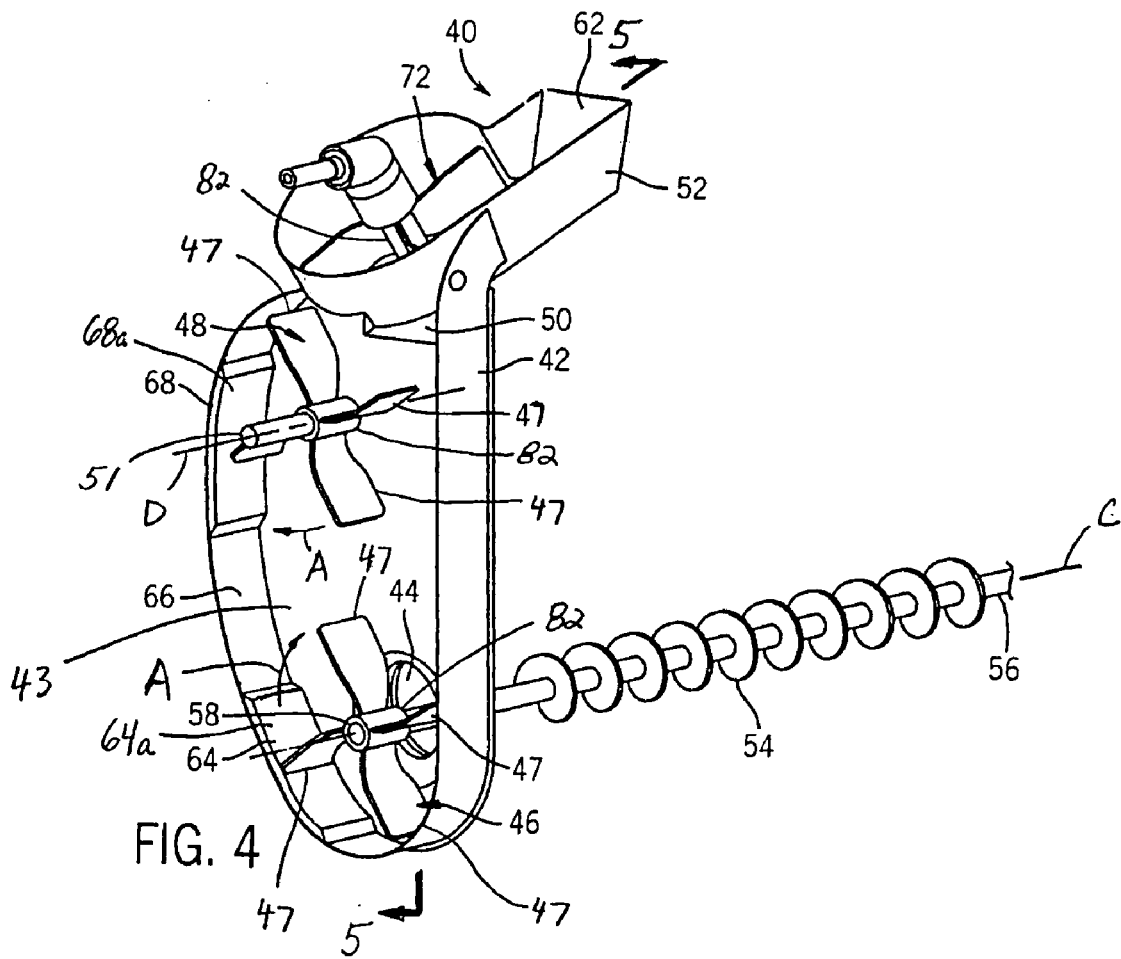
FIG. 4 is a simplified perspective view of the tailings conveyor of FIG. 2, showing the impellers.
Figure 5:
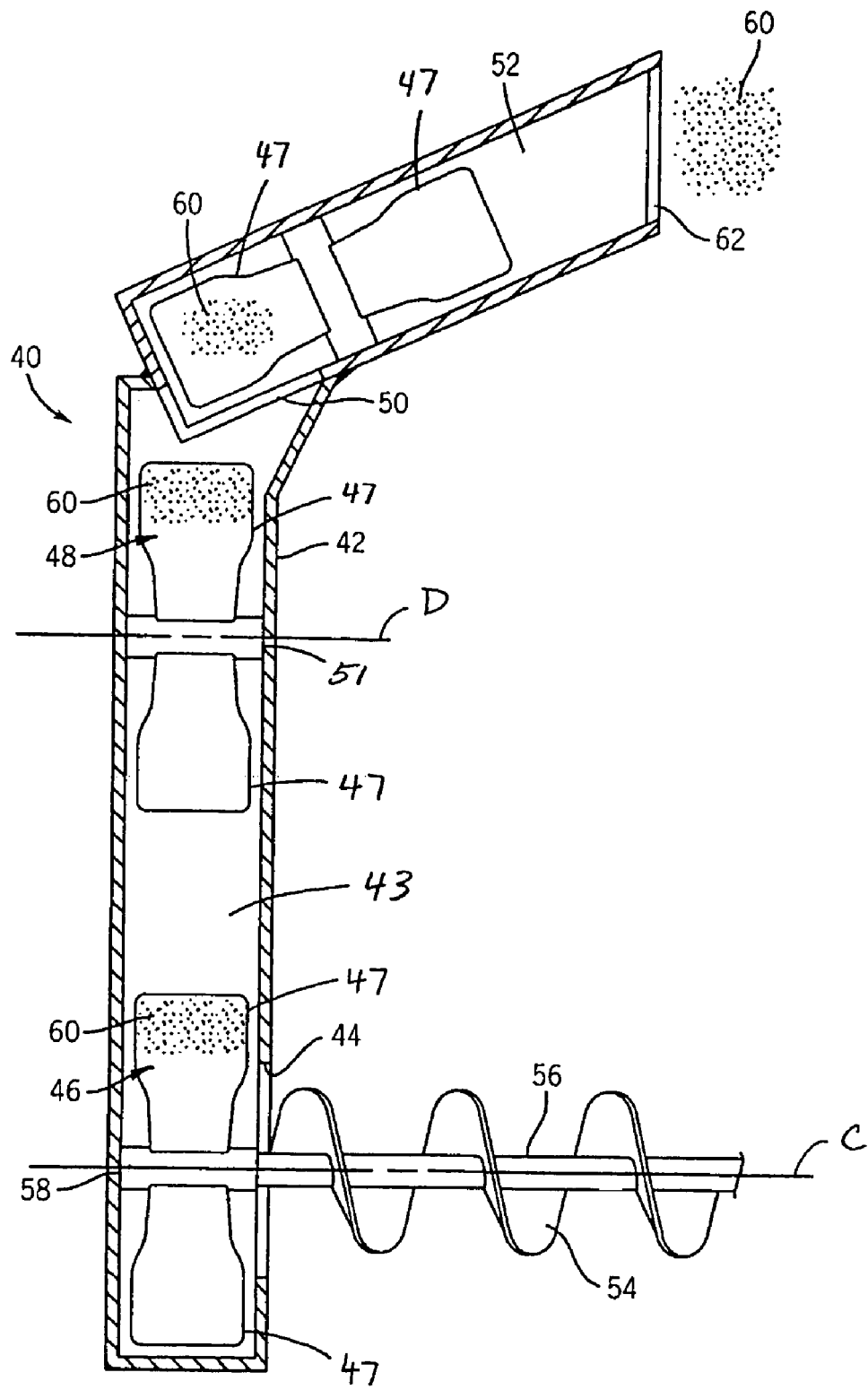
FIG. 5 is a simplified perspective view of the tailings conveyor taken along line 5—5 of FIG. 4.

Housing 42 receives the tailings through first opening 44 by means of a conventionally constructed and operable auger 54, as depicted in FIG. 3. Auger 54, as shown FIGS. 4, 5 and 6, rotates about rotational axis C on a shaft 56 coaxial with shaft 58 for moving the tailings toward tailings conveyor 40, such that the tailings will be discharged by auger 54 through first opening 44 into interior portion 43 of housing 42 in a position to be propelled by rotating first impeller 46 through interior portion 43 to second impeller 48. As an alternative, first opening 44 can be offset from the shaft 58, such as depicted at 44a in FIG. 6, so that, for instance, tailings 60 are delivered into housing 42 at a lower location or more in the vicinity of the radial outer portion of first impeller 46.

First impeller 46, second impeller 48, and third impeller 72 each include a plurality of blades 47 extending generally radially outwardly relative to the rotational axis of the respective impeller. Each of the blades 47 is preferably curved or arcuate so as to have a concave surface 47a facing oppositely of the rotational direction A, and a convex surface 47b facing forwardly in or toward the rotational direction A, such that each blade 47 is swept back relative to the rotational direction A, as best shown in FIG. 6.

The impellers 46, 48 and the second opening 50 are preferably radially in-line or aligned, such that tailings 60 which enter housing 42 at opening 44, or 44a, are propelled in rotational direction A by first impeller 46 along a radially inwardly facing threshing surface 64a of a first threshing plate 64, and into the path of rotation of radially adjacent second impeller 48, as denoted by large arrow B. Second impeller 48 will then propel tailings 60 in direction A along a radially inwardly facing threshing surface 68a of a second threshing plate 68, and through second opening 50 into conduit 52 into the path of rotation of third impeller 72, as also denoted by a large arrow B. Third impeller 72 will then propel tailings 60 through conduit 52, again as denoted by a large arrow B, so as to exit through a discharge outlet 62, so as to be spread over a predetermined region of chaffer sieve 26, or another location if desired. In interior portion 43 of housing 42, a radially inwardly facing common housing wall 66 guides and enhances the radial direction of travel of tailings 60 from first impeller 46 to second impeller 48. In conduit 52, a third threshing plate 80 can be provided having a radially inwardly facing threshing surface (not shown) for facilitating threshing by third impeller 72, and for guiding the tailings flow to conduit 52.

The preferred rotational direction A for both of impellers 46 and 48 is clockwise. The preferred rotation of impeller 72 is counterclockwise, however clockwise will also suffice. The curved or arcuate or swept back shape of blades 47 of impellers 46, 48 and 72 has been found to cause a more aggressive threshing of tailings 60 and forces the tailings 60 to the radially outer portion of the blades 47 faster, which has been found to increase conveying capacity. Threshing plate surfaces 64a, 68a and 80 may each have a rough surface texture or smooth, as desired, depending, for instance, on the crop material being processed and the extent of threshing function sought.

Figure 6:
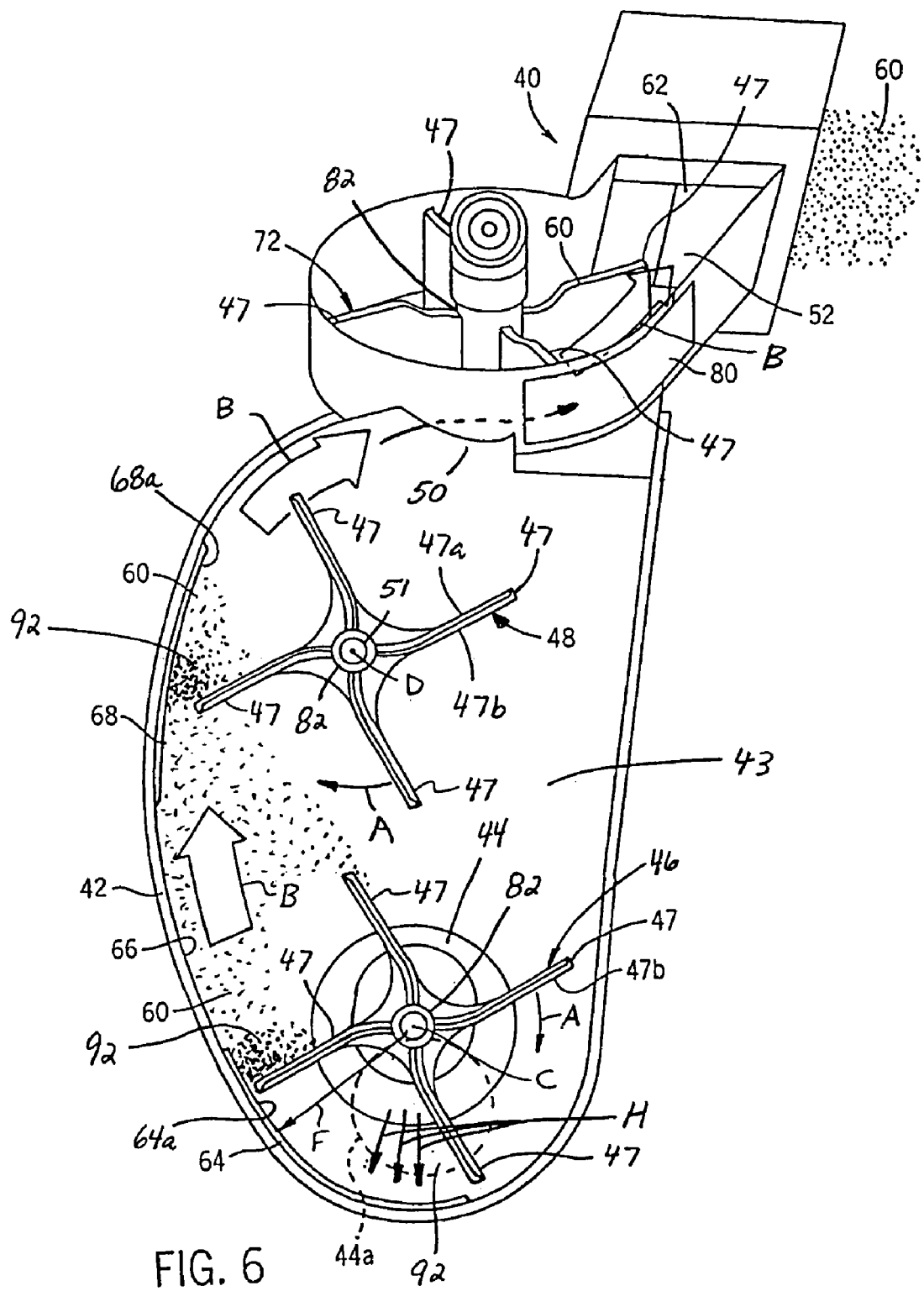
FIG. 6 is a frontal view of the tailings conveyor housing of FIG. 2 with the front cover removed and illustrating tailings being conveyed through the conveyor by the impellers.
Figure 7:
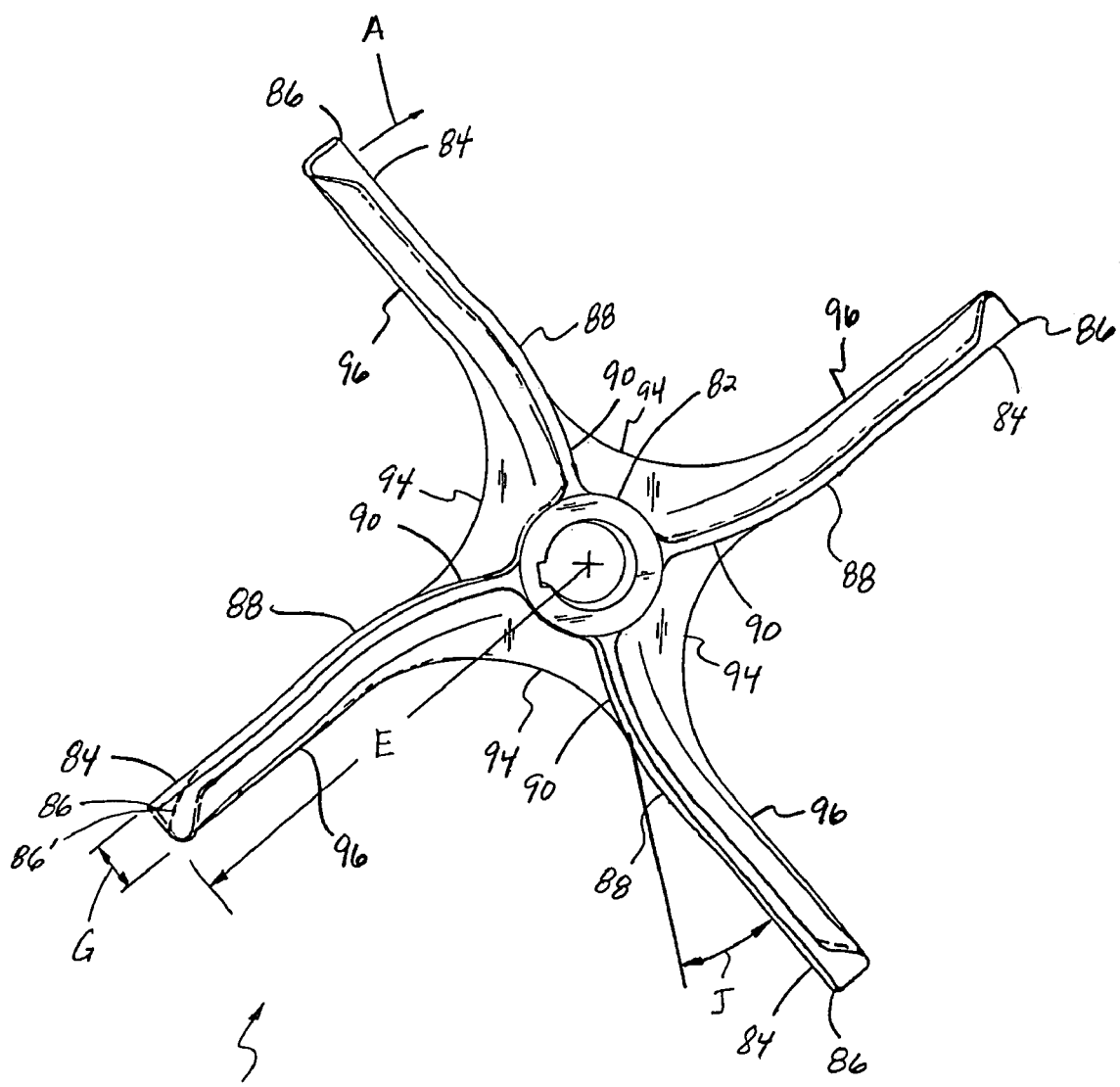
FIG. 7 is a frontal view of one of the impellers.
Figure 8:
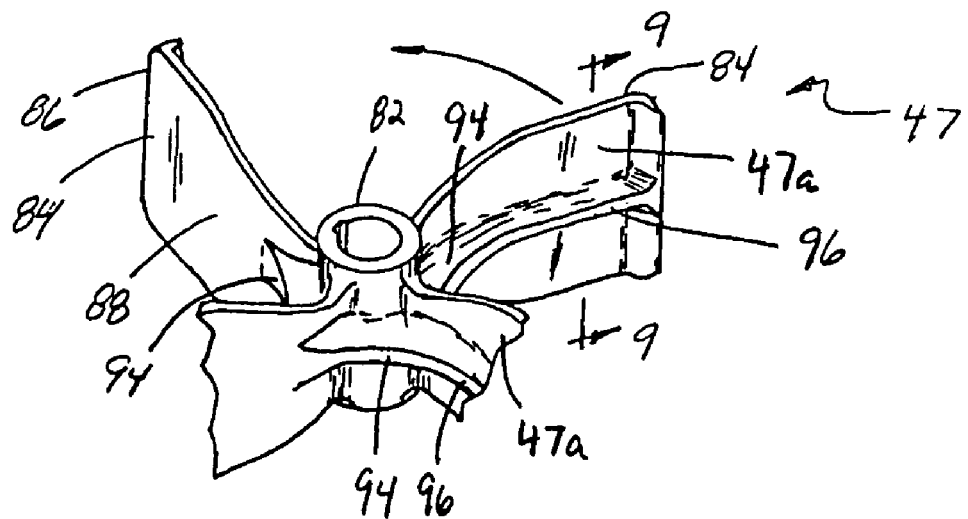
FIG. 8 is a fragmentary perspective view of one of the impellers.
Figure 9:
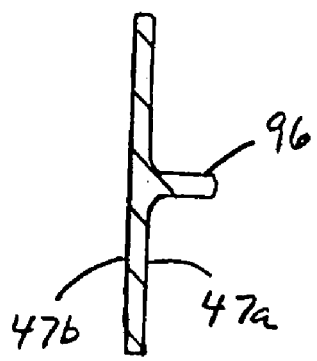
FIG. 9 is a sectional view along line 9—9 of FIG. 8.
Figure 10:
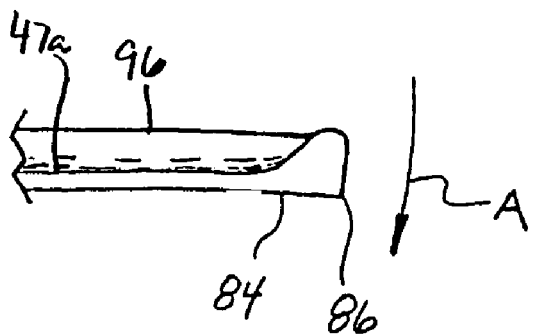
FIG. 10 is a fragmentary front view of a blade of one of the impellers, showing an extent of a radially outermost portion thereof in a rotational direction thereof.

Impellers 46, 48 and 72 each includes a mounting portion 82 which is preferably a hub, mountable to a rotatable member, such as shaft 58 of conveyor 40 in the instance of impeller 46, for rotation with the rotatable member in a predetermined rotational direction, such as direction A, about a rotational axis, such as axis C, as best shown in FIG. 6. Each impeller 46, 48 and 72 includes a plurality of blades 47, preferably four in number, which extend generally radially outwardly from mounting portion 82 at equally spaced locations around the rotational axis. As noted before, each blade 47 includes a surface 47a facing in a direction opposite the rotational direction, and a surface 47b facing in the rotational direction.

Referring also to FIGS. 7, 8, 9 and 10, a preferred embodiment of first impeller 46 is shown, which is also representative of preferred impellers 48 and 72 in both construction and operation. Surface 47b of each blade 47 of impeller 46 includes a radially outermost threshing portion 84 facing in rotational direction A and terminating at a radially outermost tip portion 86, and a tailings deflecting portion 88 which generally encompasses the convex region of the blade between threshing portion 84 and mounting portion 82. In operation, as tailings 60 are inducted into interior portion 43 of housing 42 through opening 44 or 44a, elements of the tailings, which will generally include some individual loose grain, grain partially or fully contained in pods or pod fragments, small straw pieces, pod fragments, and other plant fragments, will be impacted surface 47b and propelled or driven in direction A. In this context, it has been found that as a result of the convex shape of deflecting portion 88 of each blade, tailings 60 impacted thereby will be propelled or driven generally tangentially radially outwardly and forwardly, as illustrated by arrows H in FIG. 6, into the path of threshing portions 84 of blades 47. This will occur in a relatively turbulent manner, such that the individual tailings will collide randomly with each other and with threshing portion 84, and also with threshing surface 64a. As a result, at least some of the pods and pod fragments containing grain will be broken open to release the grain therefrom, for eventual cleaning or separation from the MOG in the cleaning system.

To facilitate or accentuate this threshing action, each blade 47 has a predetermined radial extent E as measured from the center of mounting portion 82 to tip portion 86 of the blade, which is a predetermined amount less than a predetermined minimum radial distance F from rotational axis C to threshing surface 64a (FIG. 6). As a result, tip portion 86 of each blade will pass in controlled, closely spaced relation to at least a desired portion of surface 64a, for instance, within ⅛ inch or so therefrom for some more common grains, such that the tailings will be carried or driven by tip portion 86 over surface 64a and will roll and tumble along surface 64a and be otherwise agitated so as to collide with the other tailings and threshing surfaces 64a and 84, and tip portion 86, such that at least some portion of remaining intact pods and other grain holding plant fragments will be broken open to release the grain therefrom.

As another result of the movement and action set forth above, some of the tailings, which have some abrasive properties, will pass and/or be dragged through the space between surface 64a and tip potion 86, such that wear of the affected surfaces will occur with use, particularly surface 64a and the surfaces of tip portions 86 facing in direction A. To maintain the radial length of blades 47 and provide desired impeller effective life under anticipated wear conditions, tip portions 86 each preferably have a predetermined thickness or extent G in direction A which is greater compared to the extent of most other portions of blade 47 in direction A. As a result, even as tip portion 86 wears or abrades away, as illustrated by dotted line 86' in FIG. 7, the radial extent E of blade 47 will remain substantially the same. Wear of tip portion 86 in a rearwardly curving manner such as illustrated at 86' is even contemplated to improve threshing function under some conditions. Also, threshing plate 64, or at least the portion thereof including threshing surface 64a, is preferably removable and replaceable and/or reversible.

As a result of the convex shape of deflecting portion 88 of the blades 47, threshing portion 84 is preferably swept back or extends more rearwardly relative to deflecting portion 88 in respect to rotational direction A, that is, oppositely to direction A, such that at least a portion of the deflected tailings are propelled forwardly of and into the path of threshing portion 84. Here, threshing portions 84 of blades 47 are shown swept back at an angle J of preferably about 30 degrees relative to a radial innermost portion 90 of each blade 47 extending between deflecting portion 88 and mounting portion 82, which has been found to be effective for a range of contemplated rotational speeds and grains. This swept back configuration, in combination with threshing surface 64a defines a space 92 forwardly of threshing portion 84 of each blade 47 in direction A (FIG. 6) where much of the above discussed threshing action takes place. The swept back configuration also facilitates accelerating and shedding of the tailings off of tip portions 86 of the blades after passing surface 64a, so as to be propelled toward second impeller 48.

Impeller 46 additionally includes radially outwardly extending webs 94 around mounting portion 82 connecting adjacent ones of blades 47, and ribs 96 extending radially outwardly from webs 94 along surfaces 47a for strengthening blades 47.

Here, it should be noted that although it is contemplated that second impeller 48 and third impeller 72 will be constructed the same and operate essentially the same as first impeller 46, it should also be noted that impellers 48 and 72 could be constructed differently, as required for providing different operating characteristics, as desired or required.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A rotary impeller for a tailings conveyor of an agricultural combine, for threshing tailings and propelling the tailings through a portion of the conveyor, the impeller comprising:

a mounting portion mountable to a rotatable member of the conveyor for rotation therewith in a predetermined rotational direction about a rotational axis; and a plurality of blades extending generally radially outwardly from the mounting portion, each of the blades including a surface facing in the rotational direction including a radially outermost threshing portion for threshing the tailings and propelling the tailings in the rotational direction through the portion of the conveyor, and a tailings deflecting portion disposed between the threshing portion and the mounting portion, the tailings deflecting portion having a convex shape for deflecting tailings contacted thereby during the rotation in a radially outward direction into a rotational path of the threshing portion for threshing and propelling in the rotational direction thereby through the portion of the conveyor, wherein each of the blades includes a radially outermost tip portion which has a predetermined extent in the rotational direction that is substantially flat and greater in size than an extent of other portions of the blade in the rotational direction such that the threshing portion of the surface can abrade away by an amount just less than the predetermined extent while the radial extent of the blade remains substantially constant.

2. The impeller of claim 1, wherein the threshing portion of the surface of each blade is swept back relative to the rotational direction at about a 30° angle to a radial innermost portion of the surface disposed between the deflecting portion and the mounting element.

3. The impeller of claim 1, wherein the radially outermost portions of the blades each have a predetermined extent in the direction of rotation greater than an extent in the rotational direction of the deflecting portions of the blades, respectively, so as to be capable of wearing away by an amount only marginally less than the predetermined extent while substantially maintaining an original radial extent of the blades.

4. The impeller of claim 1, wherein the deflecting portion will lead the threshing portion as the impeller is rotated in the rotational direction, such that at least some of the tailings deflected by the deflecting portion will be deflected radially outwardly forwardly of the threshing portion.

5. The impeller of claim 1, including four of the blades located at equally angularly spaced locations around the mounting portion.

6. The impeller of claim 1, further comprising webs connecting adjacent ones of the blades adjacent to the mounting portion, for limiting axial movement of the tailings during the rotation of the impeller.

7. The impeller of claim 1, wherein the threshing portion of each of the blades is swept back in the rotational direction relative to the deflecting portion so as to define a threshing space radially outwardly of the deflecting portion and forwardly of the threshing portion in the rotational direction, wherein elements of the tailings will be threshed by being propelled by the blade into one another and against an adjacent radially inwardly facing surface of a housing of the conveyor.

8. The impeller of claim 7, wherein the swept back threshing portions of the blades each have a radial extent so as to be located in predetermined closely radially spaced relation to a radially inwardly facing surface of the portion of the conveyor for limiting passage of the tailings between the threshing portions and the inwardly facing surface, and such that after passing the inwardly facing surface the threshing portions of the blades will accelerate and propel the tailings radially into another portion of the conveyor.

9. The impeller of claim 1 wherein the radially outermost threshing portion of the surface of each of the blades is substantially flat.

10. A rotary impeller for a tailings conveyor of an agricultural combine, rotatable in closely spaced relation to an inner surface portion of a housing of the conveyor for propelling tailings through at least a portion of the conveyor while at least partially threshing the tailings, comprising:

a hub mountable to a rotatable element for rotation therewith in the housing in a predetermined rotational direction about a rotational axis; and a plurality of impeller blades extending radially outwardly relative to the hub at predetermined spaced locations around the rotational axis, each of the blades having a swept back shape in the rotational direction including a radial inner portion extending generally from the hub to a tailings deflecting portion including a deflecting surface facing in the rotational direction, and a radial outer portion extending generally from the deflecting portion to a radially outermost tip portion of the blade at an acute angle to the radial inner portion, the radial outer portion including a tailings threshing surface facing in the rotational direction, such that as the impeller is rotated in the housing the deflecting surface will contact the tailings and deflect the tailings radially outwardly into an area in front of the threshing surface so as to be propelled and accelerated thereby in the rotational direction through the housing and threshed by contact with other tailings and the inner surface of the housing and the threshing surface, wherein each of the blades includes a radially outermost tip portion which has a predetermined extent in the rotational direction that is substantially flat and greater in size than an extent of other portions of the blade in the rotational direction such that the threshing portion of the surface can abrade away by an amount just less than the predetermined extent while the radial extent of the blade remains substantially constant.

11. The impeller of claim 10 wherein the tip portion will be spaced a predetermined distance from the inner surface portion of the housing during the rotation, and the radially outermost tip portion has a predetermined extent in the rotational direction such that the threshing surface can wear away by an amount up just less than the predetermined extent while the radial extent of the blade remains substantially constant.

12. The impeller of claim 10 wherein the radial outer portion of each of the blades is oriented at about a 30 degree angle to the radial inner portion of the blade.

13. A tailings impeller for rotation in closely spaced relation to an inner surface portion of a tailings conveyor housing for propelling tailings through the housing and threshing the tailings the tailings in cooperation with the inner surface portion, comprising:

a hub mountable to a rotatable element for rotation therewith in the housing in a predetermined rotational direction about a rotational axis; and a plurality of impeller blades connected to the hub and extending radially outwardly therefrom at predetermined spaced locations around the rotational axis, each of the blades having a radial inner portion extending from the hub to a tailings deflecting portion including a deflecting surface facing in the rotational direction, and a radial outer portion extending radially outwardly from the deflecting portion in swept back relation thereto in the rotational direction, the radially outer portion including a tailings threshing surface facing in the rotational direction oriented at an acute angle to the radial inner portion, such that as the impeller is rotated in the rotational direction the deflecting surface will deflect tailings coming in contact therewith radially outwardly into an area forwardly of the threshing surface in the rotational direction and guide tailings radially outwardly along the blade to the threshing surface so as to be propelled thereby in the rotational direction through the housing and threshed by randomly colliding with other tailings and contacting the inner surface portion of die housing and the threshing surface, wherein the radially outermost tip portion of each of the blades has a predetermined extent in the rotational direction that is substantially fiat and greater in size than an extent of other portions of the blade in the rotational direction such that the threshing portion of the surface can abrade away by an amount just less than the predetermined extent while the radial extent of the blade remains substantially constant.

14. The impeller of claim 13 wherein the tip portion will be spaced a predetermined distance from the inner surface portion of the housing during the rotation, and the radially outermost tip portion has a predetermined extent in the rotational direction such that the threshing surface can wear away by an amount up just less than the predetermined extent while the radial extent of the blade remains substantially constant.

15. The impeller of claim 13 wherein the radial outer portion of each of the blades is oriented at about a 30 degree angle to the radial inner portion of the blade.

* * * * *